(12) United States Patent
Osazuwa et al.

(10) Patent No.: US 11,760,639 B2
(45) Date of Patent: Sep. 19, 2023

(54) GRAPHENE NANOPLATELETS DERIVED FROM THERMOMECHANICAL EXFOLIATION OF GRAPHITE

(71) Applicant: Queen's University at Kingston, Kingston (CA)

(72) Inventors: Osayuki Osazuwa, Kingston (CA); Marianna Kontopoulou, Kingston (CA)

(73) Assignee: Queen's University at Kingston, Kingston (CA)

( * ) Notice: Subject to any disclaimer, the term of this patent is extended or adjusted under 35 U.S.C. 154(b) by 415 days.

(21) Appl. No.: 16/962,073

(22) PCT Filed: Feb. 4, 2019

(86) PCT No.: PCT/CA2019/050138
§ 371 (c)(1),
(2) Date: Jul. 14, 2020

(87) PCT Pub. No.: WO2019/148295
PCT Pub. Date: Aug. 8, 2019

(65) Prior Publication Data
US 2020/0407226 A1 Dec. 31, 2020

Related U.S. Application Data

(60) Provisional application No. 62/625,948, filed on Feb. 2, 2018.

(51) Int. Cl.
*C01B 32/19* (2017.01)
*C01B 32/194* (2017.01)
*C09C 1/44* (2006.01)

(52) U.S. Cl.
CPC ............ *C01B 32/19* (2017.08); *C01B 32/194* (2017.08); *C09C 1/44* (2013.01); *C01B 2204/02* (2013.01); *C01B 2204/04* (2013.01); *C01P 2002/72* (2013.01); *C01P 2002/82* (2013.01); *C01P 2002/85* (2013.01); *C01P 2002/88* (2013.01); *C01P 2004/03* (2013.01); *C01P 2004/04* (2013.01); *C01P 2006/40* (2013.01)

(58) Field of Classification Search
CPC ........ C01B 32/19; C01B 32/194–2204; C01B 32/04; C09C 1/44; C01P 2002/72; C01P 2002/82; C01P 2002/85; C01P 2002/88; C01P 2004/03; C01P 2004/04; C01P 2006/40
USPC .......................................... 252/502; 423/448
See application file for complete search history.

(56) References Cited

U.S. PATENT DOCUMENTS

| 8,865,113 | B2 | 10/2014 | Shankman | |
| 9,682,386 | B2 | 6/2017 | Murray et al. | |
| 2006/0122309 | A1* | 6/2006 | Grah | C01B 33/44 524/445 |
| 2020/0109250 | A1* | 4/2020 | Hamidinejad | B29C 43/003 |
| 2021/0107793 | A1* | 4/2021 | Edwards | C01B 32/182 |

FOREIGN PATENT DOCUMENTS

| CN | 101817516 A | 9/2010 |
| CN | 105329886 A | 2/2016 |

OTHER PUBLICATIONS

Horny "Optimization of thermal and mechanical properties of bio-polymer based nanocomposites." Polymer Degradation and Stability 127 (2016) 105-112 (Year: 2016).*
International Search Report and Written Opinion for corresponding International Patent Application No. PCT/CA2019/050138 dated Apr. 18, 2019.

* cited by examiner

*Primary Examiner* — Tri V Nguyen
(74) *Attorney, Agent, or Firm* — Angela Lyon

(57) ABSTRACT

A method of exfoliating layered, shearable material is described. Examples are provided including exfoliation of graphite to form graphene nanoplatelets. Also described is a machine for preparing nanoplatelets that includes a chamber whose volume can be increased by pressure exerted by the exfoliated product. Composites of graphene nanoplatelets and polyamide exhibited improved flexural modulus compared to that of graphite composites while impact strength was unaffected.

17 Claims, 10 Drawing Sheets

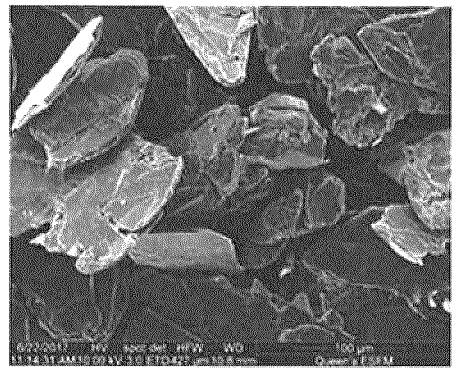 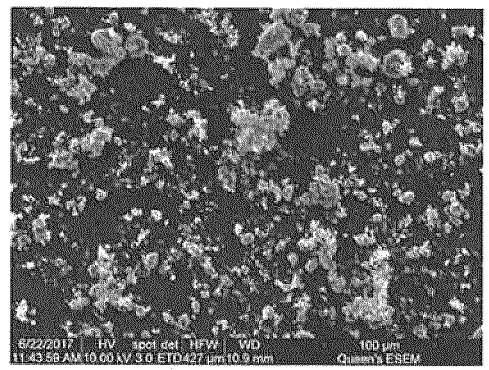
Fig. 3B          Fig. 3C
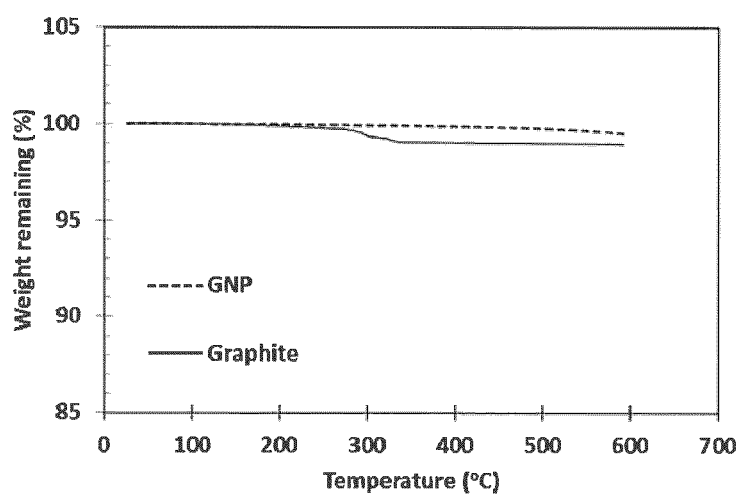
Fig. 4

GRAPHENE NANOPLATELETS DERIVED FROM THERMOMECHANICAL EXFOLIATION OF GRAPHITE

FIELD

The invention relates to graphene nanoplatelets and methods of preparing same.

BACKGROUND

Graphene is an atomic layer of $sp^2$ hybridized carbons atoms with exceptional mechanical, thermal and electrical properties. Such properties make graphene an excellent choice for applications such as polymer nanocomposites, electronic devices, batteries and supercapacitors. Several methods have been developed for the production of graphene including bottom up routes such as chemical vapor deposition and epitaxial growth and top down processes that entails the physical and chemical exfoliation of bulk graphite. Although, the former methods produce graphene with relatively small amounts of defects, they are not scalable to industrial production levels.

Exfoliation of graphite is often achieved by applying sufficient external forces to overcome van der Waals forces that exist between graphite layers, to produce nanosheets of few layers. Successful production of graphene by ultrasonication of graphite in organic solvents (Y. Hernandez, et al., Nat. Nanotechnol. 3 (2008) 563-568. doi:10.1038/nnano.2008.215), aqueous surfactant solutions (M. Lotya, et al., J. Am. Chem. Soc. 131 (2009) 3611-3620, doi:10.1021/ja807449u), and ionic liquids (N. G. Shang, et al., Chem. Commun. 48 (2012) 1877, doi:10.1039/c2cc17185f) have been reported. Although the sonication of graphite in stabilizing liquids or solutions that produce graphene nanosheets has been reported, the process may be challenging to scale (K. R. Paton, et al., Nat. Mater. 13 (2014) 624-630, doi: 10.1038/nmat3944; and Y. Hernandez, et al., Nat. Nanotechnol. 3 (2008) 563-568, doi:10.1038/nnano.2008.215). Graphite exfoliation has also been achieved using high shear in stabilizing liquids. This method has been shown to be more efficient than ultrasonication with potential scalability to industrial production levels. In addition to relatively high throughput, this method also produces high quality, defect-free graphene nanosheets suitable for specialty applications. However, the equipment that is necessary to use this method is specialized and requires the stabilizing liquid to be removed. Mechanical delamination methods of graphite suspensions to produce mono- to multilayer graphene sheets, including wet grinding, and wet ball milling have been proposed (V. León, et al, Chem. Commun. 47 (2011) 10936. doi:10.1039/c1cc14595a), (W. Zhao, et al., J. Mater. Chem. 20 (2010) 5817. doi:10.1039/c0jm01354). Given the high number of applications of graphene, there is a growing need for methods of production that are more accessible without the need for specialized equipment.

SUMMARY

In one aspect, the invention provides a method comprising disposing a layered material into an expandable chamber of a machine adapted to apply a shear force, heating the layered material to a temperature in a range of about 150 to about 250 degrees Celsius, shearing the layered material to produce an exfoliated product, modulating a volume of the expandable chamber according to a volume of layered material or exfoliated product in the expandable chamber, and obtaining the exfoliated product. In one embodiment, the layered material is graphite or expanded graphite and the exfoliated product is graphene and/or graphene nanoplatelets. In one embodiment, the method further includes grinding the layered material prior to shearing. In one embodiment, the method further includes adding surfactant prior to shearing, and optionally heating the exfoliated product to remove the surfactant. In one embodiment, shearing is applying shear force using a narrow clearance between a screw and a surrounding barrel or a narrow clearance between at least two rotating rotors.

In one embodiment, the shearing comprises an operating speed in a range of about 50 to about 150 rpm for at least two rotors located in the chamber. In one embodiment, the operating speed is about 100 rpm. In one embodiment, the temperature is in a range of about 150 to about 200° C. In one embodiment, the shearing occurs for about 15 min to about 5 hours. In one embodiment, the exfoliated product is substantially free of defects. In one embodiment, the exfoliated product has a Raman resonant peak ratio D/G of about 0.1 to about 1. In one embodiment, the exfoliated product comprises single layer graphene (SLG), few layer graphene (FLG), multilayer graphene (MLG), or a combination thereof. In one embodiment, the method further includes exposing the graphene nanoplatelets to one or more agent(s) to form coated or functionalized graphene nanoplatelets. In one embodiment, the one or more agent(s) comprises an anhydride or an amine. In one embodiment, the anhydride is trimellitic anhydride. In one embodiment, the shearing is performed in an inert atmosphere. In one embodiment, the layered material comprises hexagonal boron nitride, molybdenum disulfide, tungsten disulfide, graphite, or a combination thereof.

In one aspect, the invention provides a machine comprising an expandable chamber adapted to contain a layered material, at least one shearing element disposed in the chamber, wherein the at least one shearing element is adapted to apply a shear force to the layered material to produce an exfoliated product, a motor that drives the at least one shearing element, a heating element that heats the expandable chamber, wherein a volume of the expandable chamber is modulated according to a volume of the layered material and/or the exfoliated product in the expandable chamber.

In one embodiment, the layered material comprises hexagonal boron nitride, molybdenum disulfide, tungsten disulfide, graphite, or a combination thereof. In one embodiment, the machine further comprises at least one controller, wherein the at least one controller controls at least one parameter of the machine. In one embodiment, the at least one controller modulates a volume of the expandable chamber. In one embodiment, the machine further comprises a pressure sensor that senses pressure within the expandable chamber and outputs a sensor signal, wherein the at least one controller uses the sensor signal to control an operation of the machine. In one embodiment, the at least one controller uses the sensor signal to modulate a volume of the expandable chamber, wherein the volume of the expandable chamber increases as the pressure increases. In one embodiment, the at least one controller controls a hydraulically or pneumatically operated plunger to modulate the volume of the expandable chamber. In one embodiment, the shearing element comprises at least two rotors. In one embodiment, the at least one controller controls an operating speed of the shearing element in a range of about 50 to about 150 rpm. In one embodiment, the at least one controller controls an operating speed of the shearing element at about 100 rpm. In one embodiment, the at least one controller controls a temperature of the expandable chamber according to a selected temperature or a selected temperature range.

In one aspect, the invention provides graphene and/or graphene nanoplatelets prepared by the method of the above aspect. In one embodiment, the nanoplatelets are substantially unfunctionalized. In one embodiment, the nanoplatelets are substantially free of defects.

In one aspect, the invention provides a product comprising the graphene and/or the graphene nanoplatelets of the above aspect. In one aspect, the invention provides ink comprising the graphene and/or the graphene nanoplatelets of the above aspect.

In one aspect, the invention provides conductive coating comprising the graphene and/or the graphene nanoplatelets of the above aspect.

In one aspect, the invention provides lubricant comprising the graphene of the above aspect.

In one aspect, the invention provides a composite material comprising the graphene and/or the graphene nanoplatelets of the above aspect.

In one aspect, the invention provides a method of exfoliating material, comprising packing solid material into a chamber of a melt compounding machine, heating the solid material to a temperature in a range of about 150 to about 250 degrees Celsius, processing the material until a targeted increase in volume of exfoliated product is observed, and obtaining exfoliated product. In one embodiment the solid material is layered and/or shearable. In one embodiment of this aspect, the material is graphite or expanded graphite and the exfoliated product is graphene and/or graphene nanoplatelets.

In one aspect, the invention provides graphene and/or graphene nanoplatelets prepared by the method of the above aspect.

In one aspect, the invention provides a battery, reinforced composites, transparent conductors, wearable electronics and sensors, supercapacitors, solar cells and electrodes for batteries comprising graphene of the above aspect.

In one aspect, the invention provides a machine for preparing exfoliated material, comprising a chamber suitable for holding layered material, rotors located in the chamber such that the rotors rotate upon an axis adapted to shear material in the chamber, a motor suitable for driving the rotors, a controller for setting the speed of the motor, a heating element for heating the chamber, a rheostat for controlling the temperature of the heating element, means for connecting a power source to the motor and to the heating element, whereby the volume of the chamber can be increased by the material in the chamber exerting pressure on a release mechanism such that when pressure is exerted, the volume of the chamber is increased from a first level to a second level.

In one embodiment, the operating speed is about 100 rpm. In one embodiment, the temperature in a range of about 150 to about 250° C. In one embodiment, the temperature is about 200° C. In one embodiment of this aspect, the shearing is performed for about 15 minutes to about 5 hours.

In one embodiment, the exfoliated graphite product has a Raman resonant peak ratio D/G of about 0.1 to about 1. In one embodiment, the exfoliated graphite product has a Raman resonant peak ratio D/G of about 0.1 to about 0.5. In one embodiment, the machine comprises an internal batch mixer, a melt compounding machine, a compounder, a micro compounder, a single screw extruder, or a twin screw compounder. In one embodiment of this aspect, exfoliated graphite product comprises single layer graphene, few layer graphene (FLG), multilayer graphene (MLG), or a combination thereof. In one embodiment, the nanoplatelets are substantially free of functionalities. In one embodiment of this aspect, the nanoplatelets are substantially free of defects. In one embodiment of this aspect, the method further comprises exposing the platelets to one or more compatibilizing agent(s) to form coated, or functionalized nanoplatelets. In one embodiment of the above method aspect, the compatibilizing agent comprises an anhydride or an amine. In one embodiment of the above method aspect, the anhydride is trimellitic anhydride. In one embodiment of the above machine aspect, the release mechanism comprises a pressure sensor, locking pin, and/or a hydraulically or pneumatically operated plunger or ram. In one embodiment of the above machine aspect, the material to be sheared is hexagonal boron nitride, molybdenum disulfide, tungsten disulfide, or graphite. In one embodiment of the above method aspects, the processing is performed in an inert atmosphere. In one embodiment of the above method aspects, the processing is performed in an atmosphere comprising at least one gas having a functional moiety.

In one aspect, the invention provides a machine for preparing exfoliated material in a batch process, comprising an expandable chamber suitable for holding shearable material, two or more rotors located within the chamber that are adapted to rotate and apply shear force, a motor suitable for driving the rotors, a controller for controlling rotation of the rotors, a heating element for heating the chamber, a rheostat for controlling the temperature of the heating element, and a power source for the motor and for the heating element, whereby the volume of the chamber expands if a signal is provided.

In one embodiment of the above machine aspect, the signal is provided when the volume of the material increases as a result of shearing. In one embodiment of the above machine aspect, expansion of the chamber is effected by a release mechanism followed by movement of portion of the chamber. In one embodiment of the above machine aspect, the machine further comprises a pressure sensor that releases a locking pin. In one embodiment of the above machine aspect, the machine further comprises a hydraulically or pneumatically operated plunger or ram.

In one aspect, the invention provides a machine for preparing exfoliated material in a continuous process, comprising a conveyor system for transferring shearable material into the machine, first and second chambers that are suitable for holding and preparing exfoliated material wherein the first chamber has a first volume and the second chamber has a second volume that is greater than the first volume, at least one shearing element (e.g., two or more rotors) located within each of the first and second chambers that are suitable to apply shear force, one or more motor(s) suitable for driving the rotors, a heating element for heating the chambers, a power source for the motor(s) and the heating element, a conveyance system for transferring exfoliated material from the first chamber to the second chamber, and a conveyance system for transferring the exfoliated material out of the machine.

BRIEF DESCRIPTION OF THE DRAWINGS

For a better understanding of the present invention and to show more clearly how it may be carried into effect, reference will now be made by way of example to the accompanying drawings, which illustrate aspects and features according to preferred embodiments of the present invention, and in which:

in FIG. 1A the starting sample weighed 80 g, in FIG. 1B the starting sample weighed 100 g.

FIG. 3B shows an SEM image of initial graphite.

FIG. 3C shows an SEM image of few-layer graphene nanoplatelets product obtained by the method described herein.

FIG. 4 shows TGA data for GNP and graphite.

DETAILED DESCRIPTION

Definitions

Figure 1A:
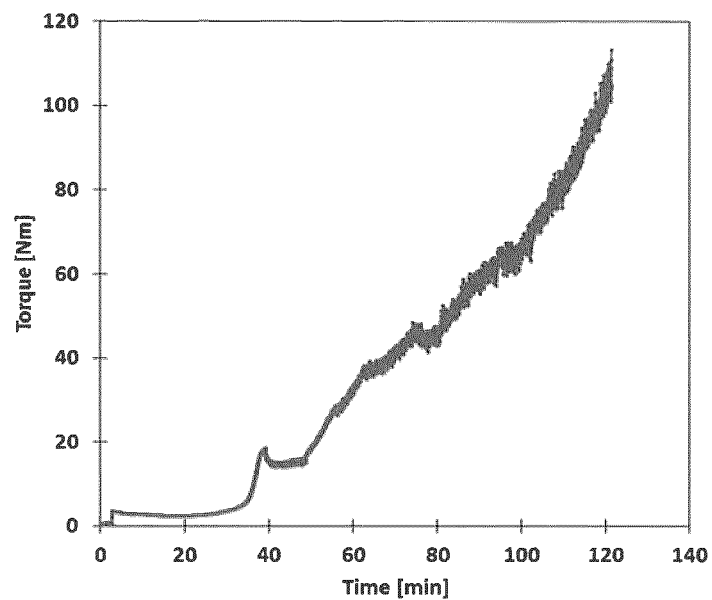
FIGS. 1A and 1B show plots of torque vs exfoliation time, which indicate rising torque (therefore decreasing bulk density) for processing conditions of Screw speed=100 rpm and Temperature=200° C.

As used herein, the term "AFM" refers to Atomic Force Microscope.

As used herein, the term "BET" refers to Brunauer-Emmett-Teller.

As used herein, the term "CM" refers to a method of functionalizing GNPs by adding filler and compatibilizer in a suitable solvent to form a mixture, agitating the mixture for a time, and eliminating the solvent.

As used herein, the term "DLD" refers to delay-line detector.

As used herein, the term "EDX" refers to energy dispersive X-ray.

As used herein, the term "EMI" refers to Electromagnetic Interference.

As used herein, the term "SLG" or single-layer graphene refers to monolayer graphene, a single layer of carbon atoms with each atom bound to three neighbours in a honeycomb structure.

As used herein, the term "FLG" refers to few-layer graphene, a two-dimensional material that has three to ten well-defined stacked graphene layers.

As used herein, the term "MLG" or multi-layer graphene refers to graphene with more than the number of layers that is referred to a "few-layer graphene" but fewer layers than 3-dimensional graphite.

As used herein, the term "NMP" refers to N-Methyl-2-pyrrolidone.

As used herein, the term "SEM" refers to Scanning Electron Microscopy.

As used herein, the term "SSA" refers to specific surface area.

As used herein, the term "TEM" refers to transmission electron microscopy.

As used herein, the term "TGA" refers to thermogravimetric analysis.

As used herein, the term "TME" refers to a thermomechanical exfoliation technique that is described herein, in one embodiment, the TME method is used to functionalize GNP by adding compatibilizers.

As used herein, the term "XPS" refers to X-ray photoelectron spectroscopy.

As used herein, the term "XRD" refers to X-Ray Diffraction analysis.

As used herein, the term "PP" refers to polypropylene.

As used herein, the term "PA" refers to polyamide.

As used herein, the term "PP-g-MA" refers to maleic anhydride grafted polypropylene, which is usually added in small amounts to PP during compounding to improve compatibility with a filler.

As used herein, the term "shearing" refers to applying a shear force. An example of how to apply shear force is squeezing material through a very narrow gap between two elements (e.g., rotating rotors or kneading elements in a twin-screw extruder). Another example is squeezing material through a narrow opening between the flight of a single screw in an extruder and barrel.

As used herein, the term "exfoliation" refers to peeling away of sheets of rock from a rock's surface.

As used herein, the term "shearable" refers to possessing a property wherein exfoliation occurs in the presence of shear forces.

As used herein, the term "layered" refers to a heterogeneous or homogeneous material that has planes along which exfoliation can occur.

As used herein, the term "expanded graphite" refers to graphite flakes that have been expanded (i.e., increased in volume). Expansion may include exposure to an intercalation agent, formation of a graphite salt between graphite layers, and exposure to a high temperature shock treatment in which the intercalation agent escapes, leaving behind a gap between the graphite layers.

As used herein, the term "nanoplate" refers to a nano-object with one external dimension in the nanoscale and the other two external dimensions significantly larger and not necessarily in the nanoscale.

As used herein, the term "graphene nanoplatelet" refers to a nanoplate of graphene layers, for example, GNPs typically have thickness of between 1 nm to 3 nm and lateral dimensions ranging from approximately 100 nm to 100 µm.

As used herein, the term "F-GNP" refers to functionalized graphene nanoplatelets.

As used herein, the term "GNP" refers to graphene nanoplatelets.

Embodiments

A thermomechanical method of exfoliation is described herein, and is referred to as the TME method. Materials that can be exfoliated using this method include any layered (i.e., shearable) materials. Examples of shearable materials include: graphite, hexagonal boron nitride, molybdenum disulfide, and tungsten disulfide. The TM exfoliation method includes packing solid shearable material into a chamber (e.g., drum) of a melt compounding machine, heating the material to a temperature in a range of about 150 to about 250° C., processing the material until a targeted increase in volume of material is observed, and obtaining exfoliated product.

In one embodiment, this method is performed in the absence of liquid medium, in another embodiment, it is performed in the presence of liquid medium. In one embodiment, this thermomechanical method is performed in the presence of a surfactant. Examples of surfactants include: sodium stearate; linear alkylbenzenesulfonates (e.g., 4-(5-dodecyl) benzenesulfonate); lignin sulfonates; fatty alcohol ethoxylates; and alkylphenol ethoxylates. In another embodiment, this thermomechanical method is performed in a machine that applies shear forces to the material.

As described in the Working Examples, an exfoliated product of the TME method was characterized to quantify its purity and quality. In one embodiment, the shearable material was graphite and the exfoliated product was graphene and graphene nanoplatelets (GNP). This method produced high purity, high quality graphene products on an industrial scale. Further characterization of the exfoliated nanoplatelets was performed by preparing a composite of the exfoliated product and polyamide or polypropylene. The composite was melt processed, and its mechanical properties were evaluated (see Table 3 and FIGS. 11A to 11C). The GNP composites of highly exfoliated nanoplatelets showed improved mechanical properties.

This TME method eliminates the limitations of existing methods (multiple experimental steps, long processing times) and offers chemical and physical modification of graphite. This method does not use harmful chemicals to effect the exfoliation. This method uses low power consumption techniques in its processing speeds and temperature and is therefore energy efficient. Its methods are scalable to an industrial level. In addition, this method can be used to produce GNP powders in one step. In one embodiment, such GNPs are F-GNPs that have surface functionality.

In one embodiment of this method of shearing material, the processing is performed in an inert atmosphere (e.g., nitrogen, argon). This atmospheric control diminishes or eliminates undesirable functional groups on the exfoliated product. In another embodiment, the processing is performed in an atmosphere comprising at least one gas that has a functional moiety.

In one aspect, a machine is provided for preparing exfoliated material in a batch process. The machine includes an expandable chamber with a working volume suitable for holding shearable material, at least one shearing element (e.g., two or more rotors) located within the working volume that applies shear force to the material, a motor suitable for driving the shearing element, a controller for controlling the shearing element, and a heating element for heating the working volume. In one embodiment, the machine includes a rheostat(s) for controlling the temperature of the heating element, and a power source for the motor and for the heating element. In one embodiment, the volume of the chamber expands as the volume of the material increases as a result of shearing. In one embodiment, expansion of the chamber is effected by a release mechanism, for example, a pressure sensor that releases a locking pin, followed by movement of portion of the chamber, for example, via a hydraulically or pneumatically operated plunger or ram.

In one aspect, a machine is provided for preparing exfoliated material in a continuous process. In this aspect, the machine includes a conveyor system for transferring shearable material into the machine, a first chamber having a working volume that is suitable for holding and preparing exfoliated material, one or more shearing element located within the chamber (e.g., two or more rotors that rotate, a screw extruder) in such a manner as to apply shear force to the material), a motor suitable for driving the shearing element, optionally a controller for controlling the rotation of the rotors, a heating element for heating the material. In one embodiment, the machine includes a rheostat for controlling the temperature of the heating element, and a power source for the motor and for the heating element, a conveyance system for transferring exfoliated material to a second chamber having a working volume that is larger than the first working volume, and a conveyance system for transferring the exfoliated material out of the machine.

As described in the Working Examples, polymer composites were produced by melt mixing in a Haake Rheomix 600 QC mixer at a temperature of 180-220° C. and rotor speed of 100-220 rpm for 6 minutes. Samples for physical testing were compression molded at 180° C. for 2 minutes in a Carver press. Scanning Electron Microscopy (SEM) was carried out on cryo-fractured sample surfaces using a JEOL JMS-840A scanning microscope. Impact strength were conducted and Flexural tests were performed on an Instron 3369 Universal tester, at a cross head speed of 1.3 mm/min using the 3-point bending method as per ASTM D790 standard.

Figure 1B:
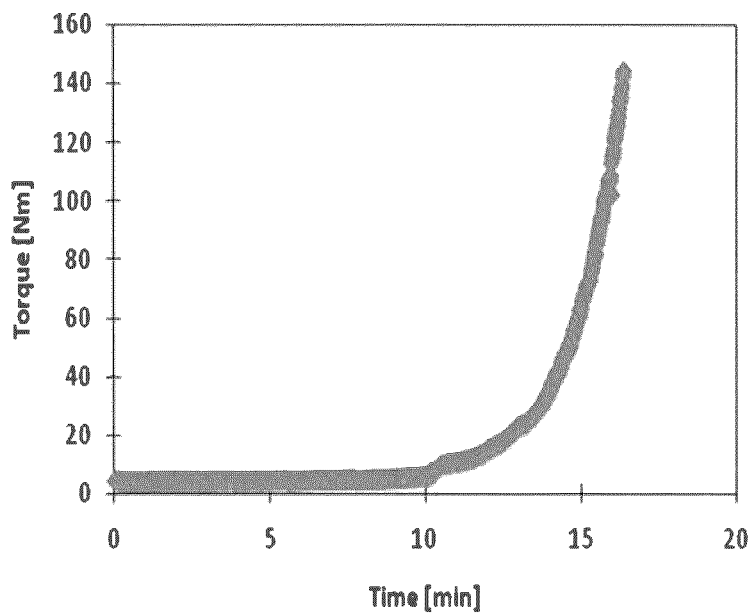

Referring to FIGS. 1A and 1B, graphite was chosen as a representative example of a layered (i.e., shearable or exfoliatable) material, and it was exfoliated by the method described herein to produce few layer graphene flakes and/or GNP. As shown in FIGS. 1A and 1B, an increase in material volume due to exfoliation was observed, as depicted by rising torque and decreasing bulk density values.

The specific surface area (SSA) measurement of the GNP was found to be 345 $m^2/g$, as determined by Brunauer-Emmett-Teller (BET) characterization (Table 1). The bulk density as determined by ASTM D7481-09 was 0.07 $g/cm^3$.

Figure 2:
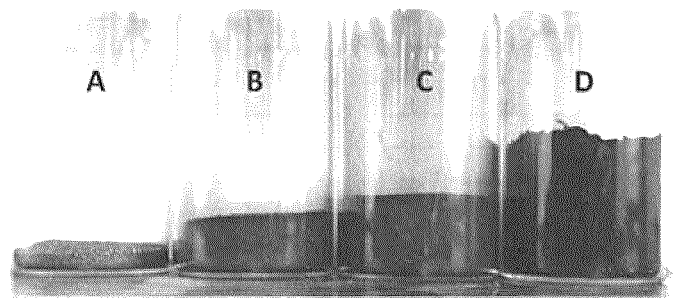
FIG. 2 shows representative images of exfoliated graphite samples that all started as samples of the same weight, showing the decrease in bulk density at different processing times.
Figure 3A:
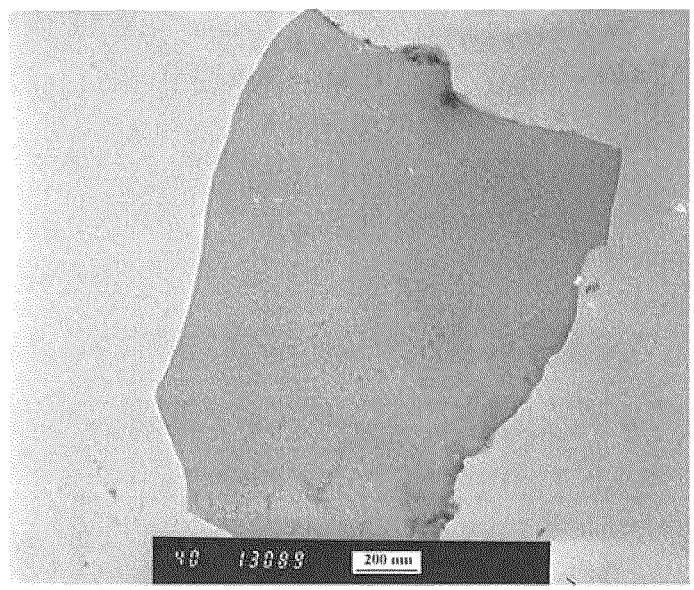
FIG. 3A shows a TEM image of sheet of few layer graphene obtained by the method described herein.

Referring to FIG. 2, images of exfoliated graphite samples are shown, which depict a decrease in bulk density. The increase in volume (and corresponding decrease in bulk density) with exfoliation time is demonstrated with samples weighing 1 g. Sample A is the starting graphite material while samples B, C, and D were exfoliated for 1.5, 3, and 5 hours, respectively. Referring to FIG. 3A, a TEM image is shown of an isolated GNP (e.g., single sheet) of few layer graphene with lateral dimensions of about 2 μm. TEM images were also obtained for centrifuged sample of 50 mg/mL flakes in NMP dropped on a TEM copper grid. SEM images of the dry graphite and exfoliated samples were recorded using a FEI MLA Quanta 650 FEG-ESEM instrument that was operated at 10 kV. The samples were mounted on to aluminum stubs using double-sided adhesive tape. FIG. 3B shows an SEM image of the starting graphite sample, whereas FIG. 3C shows an SEM image of the few-layer GNP product.

Referring to FIG. 4, TGA data is presented for graphene nanoplatelets and graphite. As shown, the GNP retained 99.5% of its original weight even after being heated to 600° C., exhibiting thermal stability better than that of pure graphite.

Figure 5:
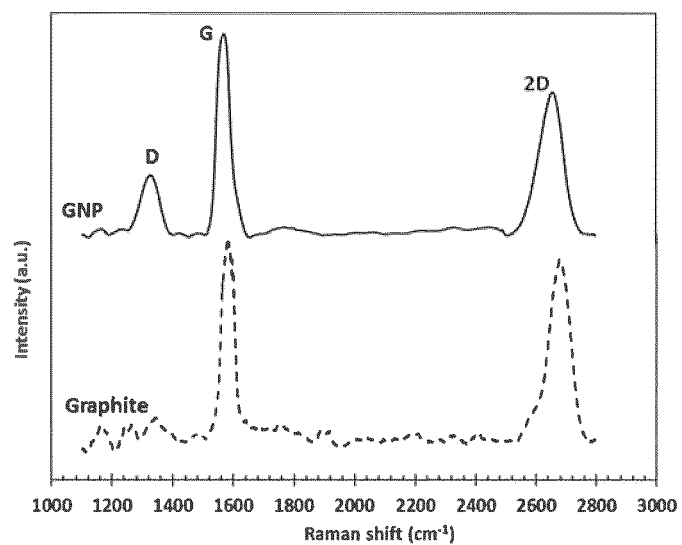
FIG. 5 shows Raman spectra of graphite and GNP.

Referring to FIG. 5, Raman spectra are shown for graphite and the product GNP of the method described herein. Structural changes during the exfoliation process are detectable by Raman spectroscopy. Raman spectra for both graphite and GNP include a G peak located around 1590 $cm^{-1}$, caused by the in-plane optical vibration (degenerate zone center E2g mode), and a D peak, located at around 1340cm$^{-1}$, associated with the first-order zone boundary phonons. Increased intensity of D peaks in GNP is indicative of defects. Since there is no broadening of G peak in GNP, then the defects are edge defects resulting from lateral size reduction of graphite flakes after exfoliation. Notably, the symmetric 2D Raman band at 2600-2800 cm$^{-1}$ is characteristic of the presence of a few layers in the GNP.

Figure 6:
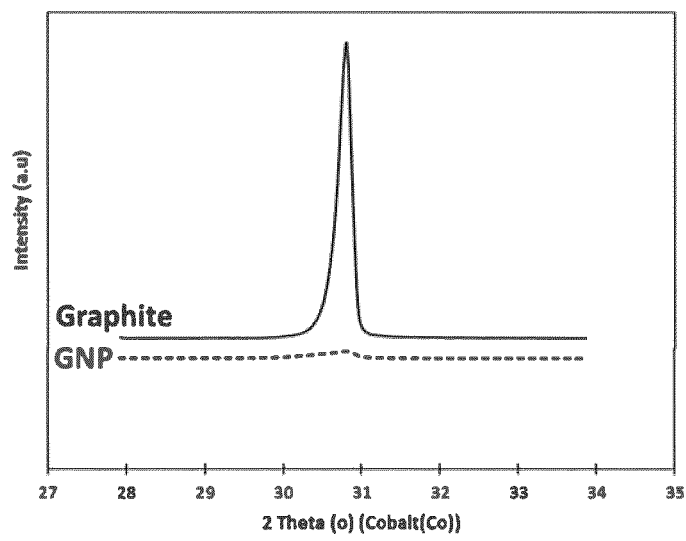
FIG. 6 shows XRD patterns of graphite and GNP.

Referring to FIG. 6, XRD patterns are shown of natural graphite and graphene nanoplatelets. As confirmed by the XRD patterns, the GNP produced was highly exfoliated. Comparison of the XRD patterns of the natural graphite with XRD patterns of the GNP show a characteristic high intensity (002) peak for natural graphite that confirms a highly organized crystalline structure of hexagonal graphite. This peak is minimized in GNP which provides evidence of the exfoliation of graphite.

AFM imaging of GNP on Silicon wafers was performed using a Bruker Dimension Edge scanning probe microscope, in peak-force tapping mode using mounted cantilever probes (Bruker, USA). All images were taken in an area of 3 μm×3 μm and were obtained at a 1 Hz scanning rate. The AFM images were then analyzed using the Bruker NanoScope Analysis software program. A section of scanned surface with GNP deposited on Silicon wafer was analyzed and its height profile of flakes was identified. According to AFM imaging, shown in FIG. 7, the mean flake thickness of GNP was 14 nm. Combining this with TEM data, an aspect ratio of the GNP product was determined to be 150.

Figure 8:
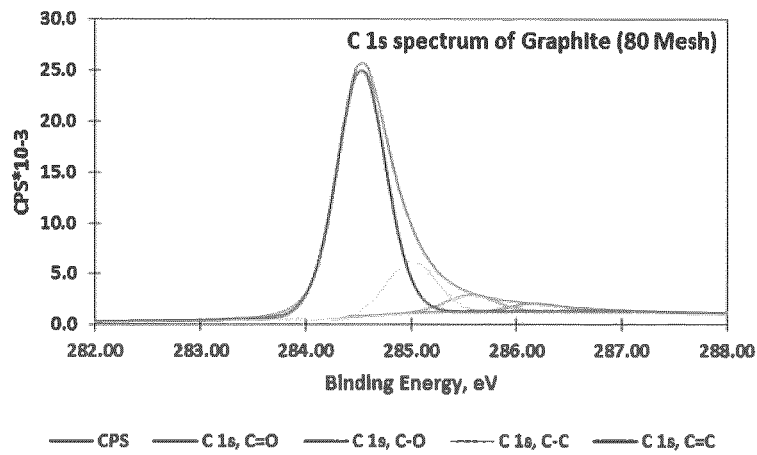
FIG. 8 shows a XPS spectrum of starting graphite material.

Referring to FIG. 8, a XPS spectrum is shown of starting graphite material.

Figure 9:
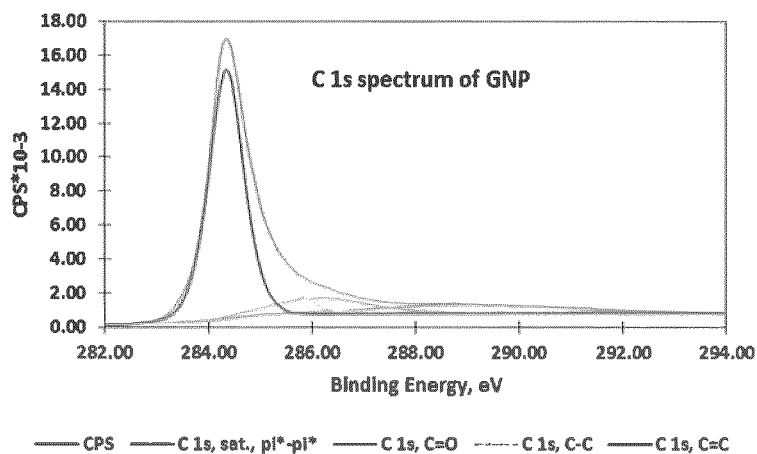
FIG. 9 shows a XPS spectrum of GNP product of the method described herein.

Referring to FIG. 9, a XPS spectrum is shown of GNP product material. Binding energies are referred to the C1s peak at 285 eV. High resolution spectra for O1s and C1s were obtained in the appropriate regions. The C1s spectrum from a sample with high concentration of sp2 carbon will have a broad, asymmetric tail towards higher binding energy. One or more satellite features, several eV from the main C1 s peak, will also be observed in samples with high sp2 concentration. For high concentrations of sp3-bonded carbon, the C1s peak will have a more symmetric shape and will also be slightly shifted to higher binding energy. GNP has a carbon content of 94% (no other trace elements) compared to 90% for the graphite. Also, the atomic concentration of O is less than 5.44% for the GNP but higher than 7.11% the starting material (Table 2)

Figure 10:
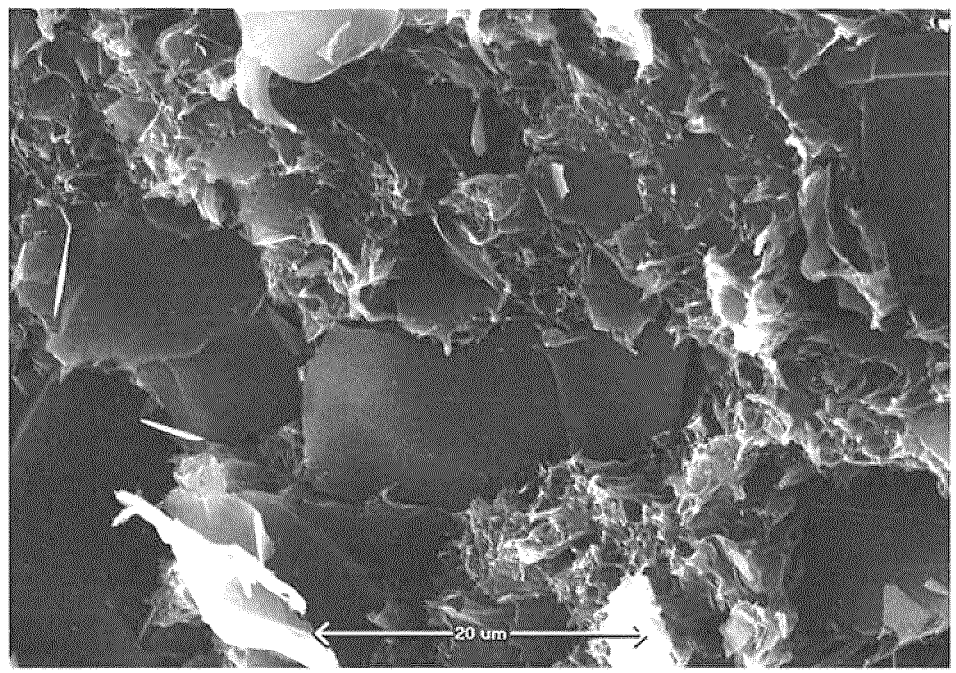
FIG. 10 shows a SEM image of 28.5 wt % GNP/polyamide composite.

Referring to FIG. 10, a SEM image is shown of 28.5 wt % GNP/PA composite of highly exfoliated GNPs with good dispersion in and adhesion with the matrix.

Figure 11A:
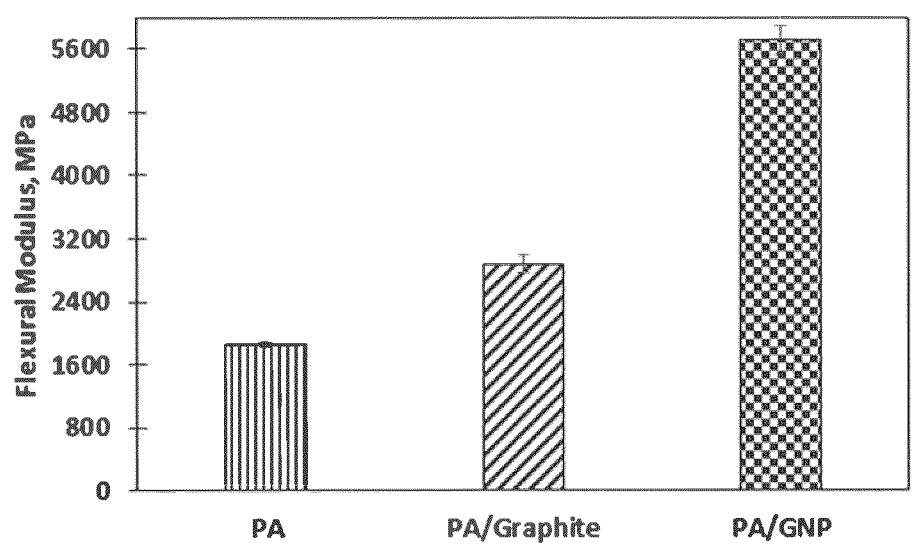
FIG. 11A shows a plot of flexural modulus of 28.5 wt. % graphite/polyamide composite and 28.5 wt. % GNP-polyamide composite relative to polyamide with 0 wt. % filler.
Figure 11B:
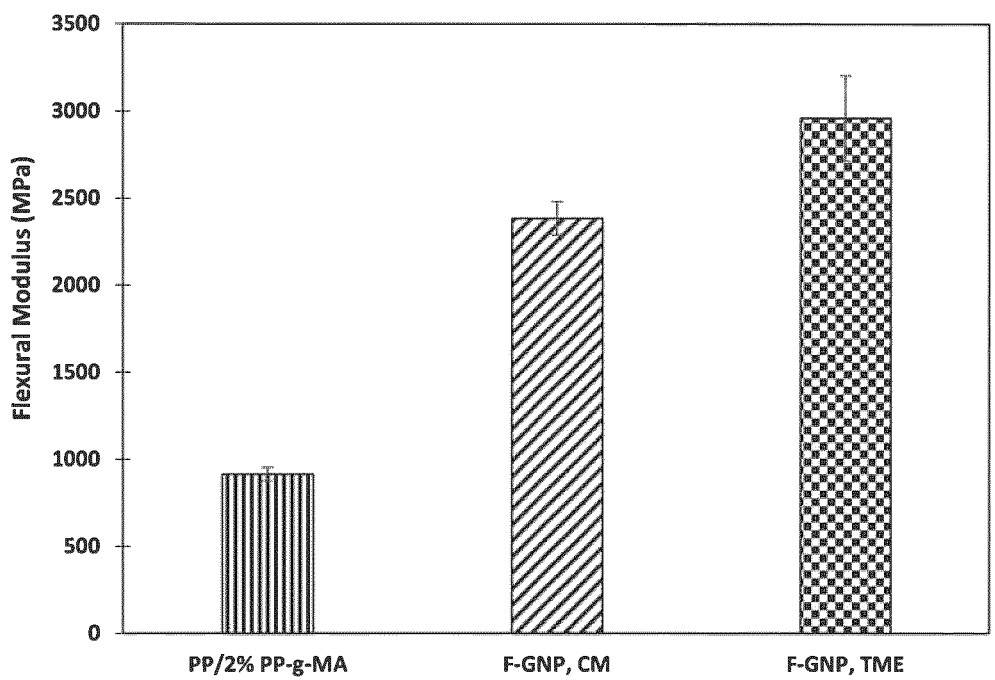
FIG. 11B shows a plot of flexural modulus for modified GNP composites as indicated.

As shown in Table 3, the impact properties were reduced slightly, whereas the electrical conductivity was increased by orders of magnitude to 0.94 S/m for PA/GNP and 21.7 S/m for PA/F-GNP. Referring to FIGS. 11A and 11B, bar graphs are used to compare flexural modulus. In FIG. 11A, a bar graph is used to compare no filler content, and 28.5% filler content of the specified fillers. In FIG. 11B, a bar graph is used to compare (i) a polypropylene composite of 28.5 wt % F-GNP prepared using the TME method, (ii) a polypropylene composite of 28.5 wt % F-GNP prepared using a conventional solution method (CM), and (iii) neat polypropylene (i.e., polypropylene having 2% PP-g-MA).

Figure 11C:
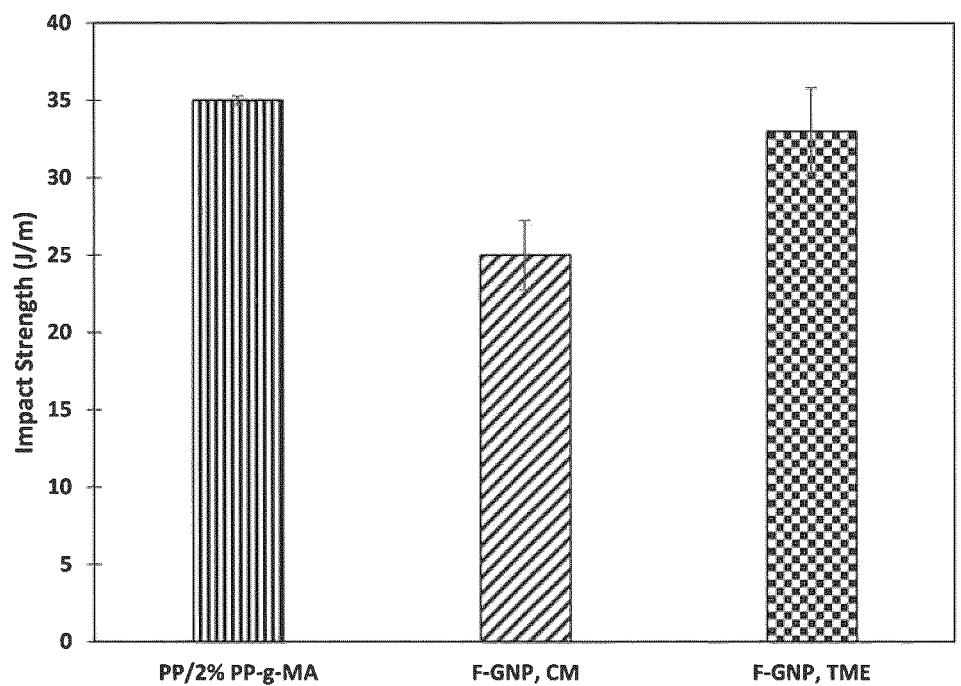
FIG. 11C shows a plot of impact strength of modified GNP composites as indicated.

Impact strength, which refers to the resistance of a material to fracture by a blow, is another measure of strength that is used to compare materials. Referring to FIG. 11C, a bar graph is used to compare impact strength of (i) a polypropylene composite of an F-GNP, specifically an anhydride-modified GNP, prepared using the TME method, (ii) a polypropylene composite of 28.5 wt % F-GNP prepared using the CM method, and (iii) neat polypropylene (i.e., polypropylene having 2% PP-g-MA). The flexural modulus of the F-GNP composite showed an improvement of nearly 26% relative to the composite from the CM process. The flexural modulus of the F-GNP composite showed an improvement of nearly 350% relative to neat PP. The impact strength of the F-GNP composite was equivalent to neat PP (approximately 3% less). In contrast, the impact strength of the composite from the CM process was 30% less relative to neat PP. In conclusion, F-GNP composites provide improved flexural modulus and exhibit impact strength that is equivalent to a known standard (neat PP).

Figure 12:
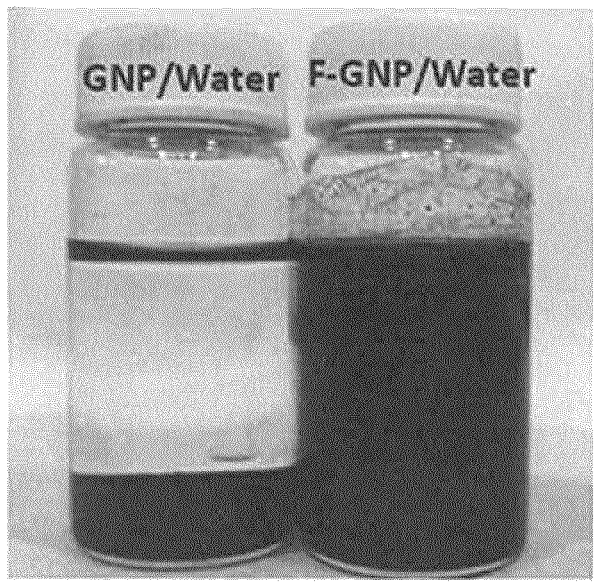
FIG. 12 shows a photograph of two vials, one of a mixture of GNP and water, and the other a mixture of anhydride-modified F-GNP that were prepared using the TME method.

GNPs were functionalized using the thermomechanical method described herein (TME) to prepare F-GNP. Referring to FIG. 12, a photograph of two vials is shown. One vial is GNP in water and the other is functionalized GNP (F-GNP) in water. The F-GNP was anhydride-modified using the TME method. This method was used for the surface modification of GNP for polymer composite processing using trimellitic anhydride. The anhydride functionalized F-GNP was shown to form a dispersion in water whereas GNP precipitated. Flexural modulus, which refers to the ability of a material with a specific cross-section to resist bending when placed under stress, was used to compare composites that include GNP that was prepared using the method described herein with composites containing graphite. Referring to Table 3, the flexural modulus of a PA (e.g., Nylon® 6, 12) composite of 28.5 wt % GNP relative to a PA composite of 28.5 wt % F-GNP, and relative to neat PA is shown. The flexural modulus of a PA composite with 28.5 wt % graphite by comparison was 3,000 MPa. Accordingly, PA/GNP and PA/F-GNP composites with improved flexural modulus were obtained when compared to that of graphite/polyamide composites.

In one embodiment, a machine is described for preparing nanoplatelets. The machine includes a chamber suitable for holding layered material. Located inside the chamber is at least one element suitable for exerting shearing force upon the layered material. Examples of such a shearing element include at least two rotating rotors, such that the rotors rotate upon an axis adapted to shear material in the chamber. Other examples of a shearing element include squeezing material through a very narrow gap between two elements (e.g., rotating rotors or kneading elements in a twin-screw extruder). Another example is squeezing material through a narrow opening between the flight of a single screw in an extruder and barrel.

The machine also includes a motor suitable for driving the shearing element (e.g., rotors). The machine also includes at least one controller. Examples of parameters that are controlled by the at least one controller include speed of the motor, heating of the chamber which may include a rheostat for controlling the temperature of a heating element, and volume of the chamber which may include a sensor. In one embodiment, the controller is a switch. In one embodiment, the controller is an analogue variable controller such as a rheostat or potentiometer. In one embodiment, the controller is a digital controller including, for example, one or more logic gates, a microcontroller, etc. In one embodiment, the volume of the expandable chamber is modulated according to a volume of the layered material or the exfoliated product in the expandable chamber.

The machine may include a battery or wires to connect the motor and/or heating element to a power source. A feature of the machine is its ability to modulate (i.e., expand or contract) the capacity (i.e., volume) of the chamber. For example, the volume of the chamber can be increased by exerting pressure on a release mechanism such that when pressure is exerted, the volume of the chamber is increased from a first level to a second level. In one embodiment, the material in the chamber is what exerts pressure sufficient to increase the volume of the chamber. In one embodiment, a sensor detects the amount of material in the chamber and a signal is sent to cause the volume to be adjusted.

Applications of materials that are sheared by the method described herein include use in batteries, aerospace, composites, 3D printing (filaments and pellets), improving thermal and electrical conductivity in polymers, automotive applications (e.g., light weighting, EMI shielding, lubricants, supercapacitors), energy storage, electronic applications (e.g., conductive inks, thermal coatings and grease for heat management), sporting goods, infrastructure (e.g., additive in concrete, water purification), defense, and in medical applications (e.g., biosensor, diagnostic devices).

WORKING EXAMPLES

Graphite (purity >97%) was purchased from Sigma Aldrich (Ontario, Canada) and used as received. Trimellitic anhydride (1,2,4-Benzenetricarboxylic anhydride) was purchased from Sigma-Aldrich.

Example 1. Thermomechanical Exfoliation of Graphite

Graphite was exfoliated by shearing in a Haake Rheomix 600 QC mixer at 200° C., 5-180 rpm for 2-5 h. Through elevated temperature and mechanical shear, production of few layer graphene flakes or graphene nanoplatelets was achieved. An increase in material volume due to exfoliation was noted through rising torque values and a decrease in bulk density. See FIGS. 1A and 1B for graphs quantifying these observations and FIG. 2 for representative images.

Example 2. Characterization of Exfoliated Graphene Nanoplatelets

The specific surface area (SSA) of the GNP was 345 m$^2$/g, as determined by Brunauer-Emmett-Teller (BET) characterization. The SSA data are shown in Table 1.

GNP samples weighing 0.5-1.0 g were first degassed at 110° C. for 24 h and then subjected to a multipoint BET physisorption analysis (Autosorb-1 Quantachrome, USA) for nitrogen relative vapor pressures in the range 0.1-0.3 at 77 K.

TEM images were obtained for centrifuged sample of 50 mg/ml flakes in NMP dropped on a TEM copper grid using a FEI Tecnai20 instrument (FEI Co., Eindhoven, Netherlands) (see FIG. 3A).

Scanning Electron Microscopy (SEM) images of dry flakes were obtained using a JEOL JMS-840A scanning microscope equipped with an energy dispersive X-ray (EDX) Oxford ISIS 300 micro-analytical system (see FIGS. 3B and 3C).

Thermogravimetric analysis was carried out with a Q500 TGA apparatus by TA Instruments. Samples (6±0.5 mg) were heated from ambient temperature to 600° C. under a 50 mL/min flow of N$_2$. A heating rate of 20° C./min was used and continuous recordings of the heat flow, sample temperature, sample weight and its time derivative were taken (see FIG. 4).

Raman studies were performed using a Jobin-Yvon/Horiba micro-Raman Spectrometer (Model: Lab RAM) equipped with a 632 nm He/Ne laser source, 1800 1/nm grating and an Olympus BX41 microscope system. The laser power at the sample was kept at 0.17 mW. Collection of the spectra was performed in the backscattered mode with the use of a filter at room temperature under the following conditions: 100 microscope objective, 100 mm pinhole size, 300 mm slit width, and 30 min exposure time. Each spectrum represents the average of two measurements (see FIG. 5).

In regard to XRD testing, samples were scanned with a Philips (PANalytical) X'Pert Pro MPD diffractometer fitted with an X'Celerator high speed strip detector. Samples were mounted as fine powder on Si zero background plates. Analysis was carried out with Co Kα radiation (Fe filtered), 0.02 rad incident beam soller, 15 mm mask, ½° divergence slit, 1° anti-scatter slit, and 0.02° diffracted beam soller. Count time was 45 sec at 0.02° 2θ increments scanned from 5° to 90° 2θ with sample rotation at 2 sec/revolution. PanAlytical HighScore software was used for phase identification with the Powder Diffraction File Release 2001 database published by International Centre for Diffraction Data in 2001.

XRD studies showed that the GNP that was produced was highly exfoliated, as confirmed by the X-ray diffraction (XRD) patterns presented in FIG. 6. The XRD patterns of the natural graphite and GNP showing the characteristic high intensity (002) peak for natural graphite that confirms a highly organized crystalline structure of hexagonal graphite. This peak is minimized in GNP which proves the exfoliation of graphite.

Figure 7:
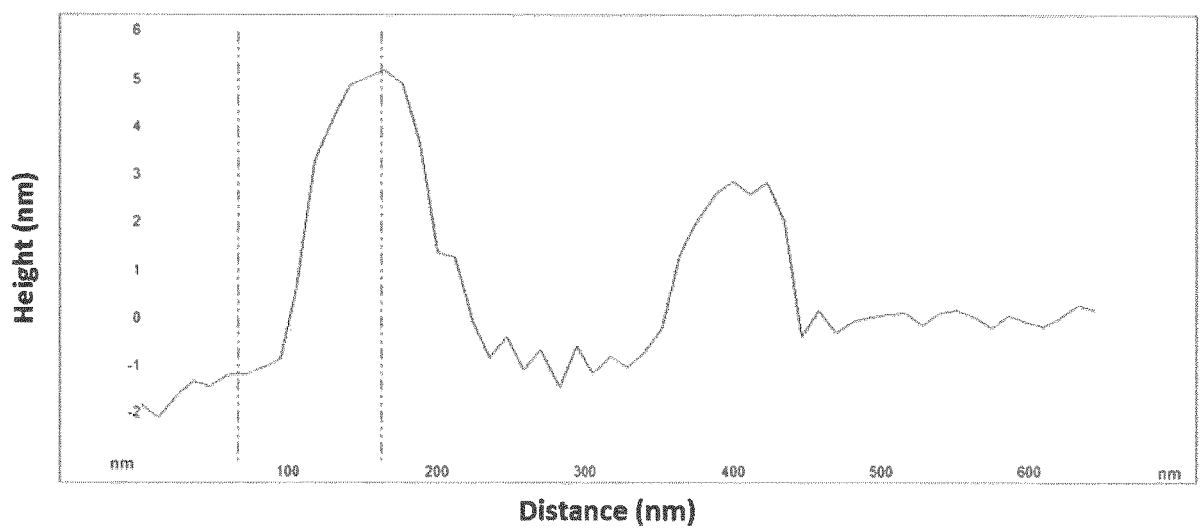
FIG. 7 shows data obtained from an AFM image of few layer GNP product.

AFM imaging was carried out on GNP using a Bruker Dimension Edge Atomic Force Microscope system with contact, tapping and peak force tapping imaging modes (see FIG. 7)

XPS spectra were measured on a Kratos Nova AXIS spectrometer equipped with an Al X-ray source. The samples were mounted onto SEM mounts (with the pins cut off) using double-sided adhesive Cu tape. After removing excess powder, the SEM mounts were attached to the coated aluminum platen using double-sided adhesive Cu tape. The samples were kept under high vacuum (10-9 Torr) overnight inside the preparation chamber before they were transferred into the analysis chamber (ultrahigh vacuum, 10-10 Torr) of the spectrometer. The XPS data were collected using AlKα radiation at 1486.69 eV (150 W, 15 kV), charge neutralizer and a delay-line detector (DLD) consisting of three multichannel plates. Binding energies are referred to the C1s peak at 285 eV. Survey spectra were recorded from −5 to 1200 eV at a pass energy of 160 eV (number of sweeps: 1) using an energy step size of 1 eV and a dwell time of 100 ms. High resolution spectra for O1s and C1s in the appropriate regions at a pass energy of 20 eV (number of sweeps: O1s, 5; C1 s, 10) using a dwell time of 300 s and energy step sizes of 0.1 eV. The analyzed area on the specimens was about 300×700 μm$^2$ (lens mode: FOV 1) at this position (see FIGS. 8 and 9, and Table 2).

Example 3. Composites Processing and Characterization

Polymer composites were produced by melt mixing (i) PP and 28.5 wt. % anhydride-modified F-GNP (modified via the TME process), and (ii) PP and 28.5 wt. % anhydride-modified F-GNP (modified via the CM solution process) in a Haake Rheomix 600 QC mixer at a temperature of 180° C.

and rotor speed of 100 rpm for 6 minutes. Samples for physical testing were compression molded at 180° C. for 2 minutes in a Carver press. Flexural tests were performed on an Instron 3369 Universal tester, at a cross head speed of 1.3 mm/min using the 3-point bending method as per ASTM D790 standard.

Mechanical properties of test composites, which were composites of PP with 28.5 wt % anhydride-modified F-GNP (prepared via the TME and CM methods), were compared with the control, which was neat PP). The flexural modulus of the composite with F-GNP (from the TME process) showed an improvement of nearly 26% relative to the composite from the CM process, see FIG. 11B. The flexural modulus of the composite with F-GNP (from the TME process) showed an improvement of nearly 350% relative to neat PP. The impact strength of composite with F-GNP (from the TME process) was substantially equivalent to that of neat PP, in that it was approximately 3% less. In contrast, the impact strength of composite with F-GNP (from the CM process) was 30% less relative to neat PP, see FIG. 11C. In conclusion, composites with F-GNP (from the TME process) provide improved flexural modulus and exhibit impact strength that is equivalent to a known standard (neat PP).

All publications listed and cited herein are incorporated herein by reference in their entirety. It will be understood by those skilled in the art that this description is made with reference to certain preferred embodiments and that it is possible to make other embodiments employing the principles which fall within its spirit and scope as defined by the claims.

TABLE 1

Specific surface area and bulk density of graphite products with processing times

| Sample | $SSA_{BET}$ (m²/g) | Bulk density (g/cm³) |
| --- | --- | --- |
| Graphite | 4 | 0.67 |
| GNP-1 | 162 | 0.17 |
| GNP-2 | 328 | 0.10 |
| GNP-3 | 345 | 0.07 |

TABLE 2

XPS data for graphite and GNP

| Name | Position | FWHM | Area | At % |
| --- | --- | --- | --- | --- |
| Graphite | | | | |
| O 1s | 530.07 | 3.75 | 5527.07 | 7.11 |
| C 1s | 284.07 | 2.44 | 25180.8 | 90.94 |
| Fe 2p | 710.07 | 4.28 | 1153.87 | 0.39 |
| Si 2p | 101.07 | 3.57 | 284.39 | 0.87 |
| S 2p | 168.07 | 8.03 | 455.7 | 0.68 |
| GNP | | | | |
| O 1s | 531.83 | 3.8 | 3774.09 | 5.44 |
| C 1s | 283.83 | 2.66 | 23402.54 | 94.56 |

TABLE 3

Mechanical properties and electrical conductivity of PA composites

| Sample | Electrical Conductivity (S/m) | Flexural Modulus (MPa) | Impact Strength (J/m) |
| --- | --- | --- | --- |
| PA | 5.00E-14 | 1854 ± 19 | 34 ± 4.2 |
| PA/28.5 wt. % GNP | 0.94 | 5717 ± 175 | 27 ± 1.5 |
| PA/28.5 wt. % F-GNP | 21.7 | 5084 ± 102 | 27 ± 1.5 |

We claim:

1. A method, comprising:
   disposing a layered material into an expandable chamber of a machine adapted to apply a shear force;
   heating the layered material to a temperature in a range of about 150 to about 250 degrees Celsius;
   shearing the layered material to produce an exfoliated product;
   modulating a volume of the expandable chamber according to a volume of layered material or exfoliated product in the expandable chamber; and
   obtaining the exfoliated product.

2. The method of claim 1, wherein the layered material is graphite or expanded graphite and the exfoliated product is graphene and/or graphene nanoplatelets.

3. The method of claim 2, wherein the exfoliated product comprises single layer graphene (SLG), few layer graphene (FLG), multilayer graphene (MLG), or a combination thereof.

4. The method of claim 2, further comprising exposing the graphene nanoplatelets to one or more agent(s) to form coated or functionalized graphene nanoplatelets.

5. The method of claim 1, further comprising grinding the layered material prior to shearing.

6. The method of claim 1, further comprising adding surfactant prior to shearing, and optionally heating the exfoliated product to remove the surfactant.

7. The method of claim 1, wherein the temperature is in a range of about 150 to about 200° C.

8. The method of claim 1, wherein the shearing occurs for about 15 min to about 5 hours.

9. The method of claim 1, wherein the exfoliated product has a Raman resonant peak ratio D/G of about 0.1 to about 1.

10. A machine, comprising:
    an expandable chamber adapted to contain a layered material;
    at least one shearing element disposed in the chamber, wherein the at least one shearing element is adapted to apply a shear force to the layered material to produce an exfoliated product;
    a motor that drives the at least one shearing element;
    a heating element that heats the expandable chamber;
    wherein a volume of the expandable chamber is modulated according to a volume of the layered material and/or the exfoliated product in the expandable chamber,
    wherein the at least one controller modulates a volume of the expandable chamber and
    wherein the at least one controller controls a hydraulically or pneumatically operated plunger to modulate the volume of the expandable chamber.

11. The machine of claim 10, wherein the layered material comprises hexagonal boron nitride, molybdenum disulfide, tungsten disulfide, graphite, or a combination thereof.

12. The machine of claim 10, further comprising a pressure sensor that senses pressure within the expandable chamber and outputs a sensor signal, wherein the at least one controller uses the sensor signal to control an operation of the machine.

13. The machine of claim 12, wherein the at least one controller uses the sensor signal to modulate a volume of the expandable chamber, wherein the volume of the expandable chamber increases as the pressure increases.

14. The machine of claim 10, wherein the at least one shearing element comprises at least two rotors.

15. The machine of claim 10, wherein the at least one controller controls an operating speed of the shearing element in a range of about 50 to about 150 rpm.

16. The machine of claim 10, wherein the at least one controller controls an operating speed of the shearing element at about 100 rpm.

17. The machine of claim 10, wherein the at least one controller controls a temperature of the expandable chamber according to a selected temperature or a selected temperature range.

\* \* \* \* \*